United States Patent Office 2,922,238
Patented Jan. 26, 1960

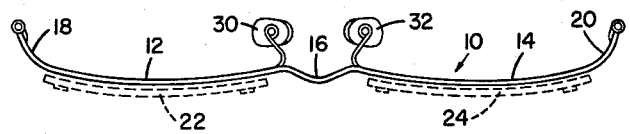
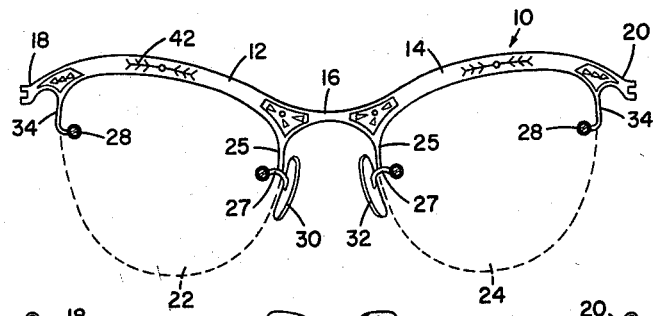
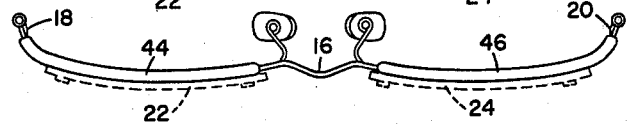
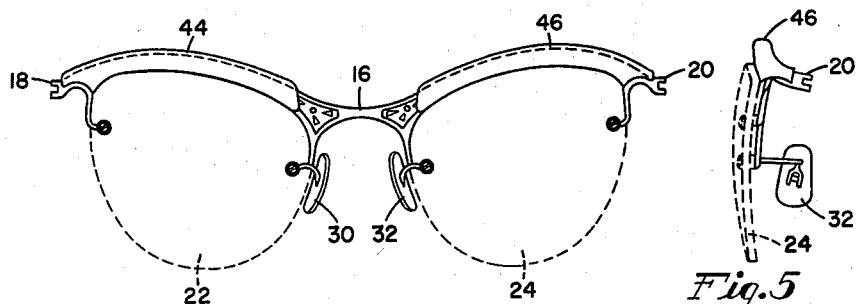
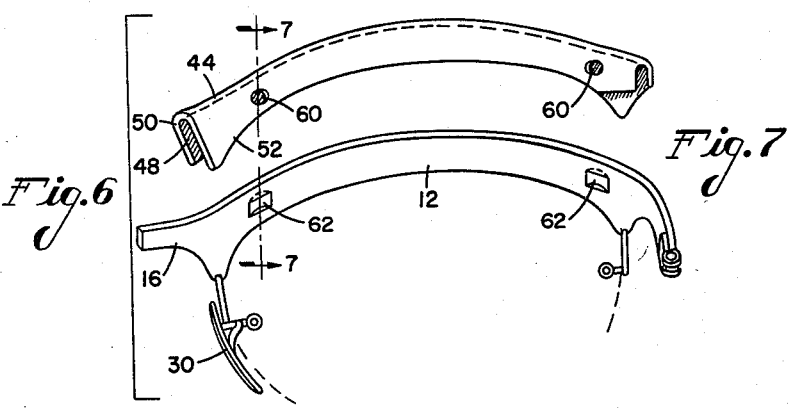

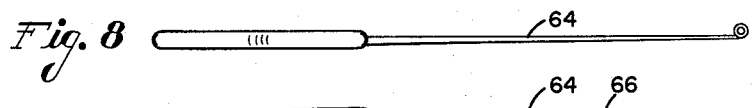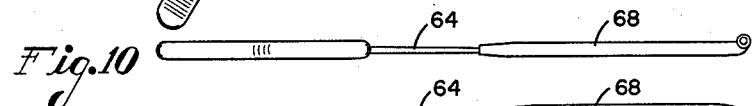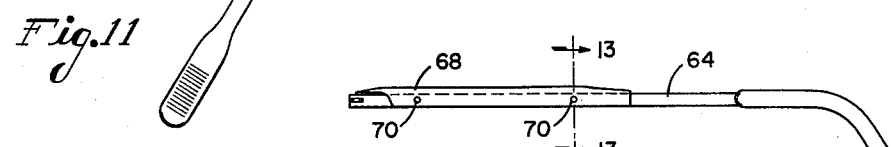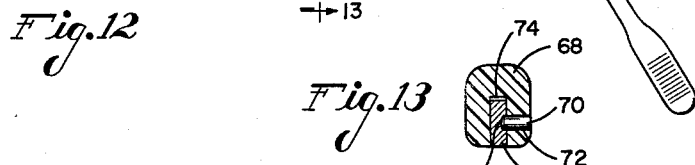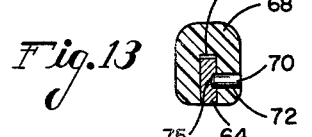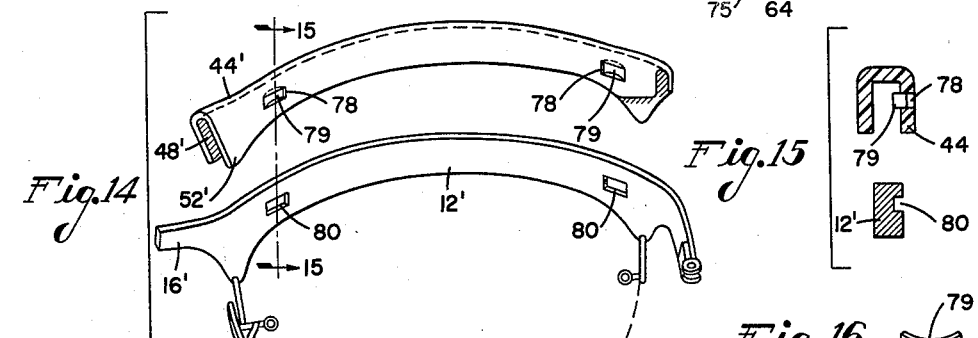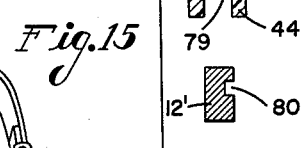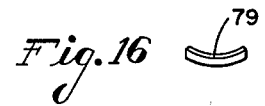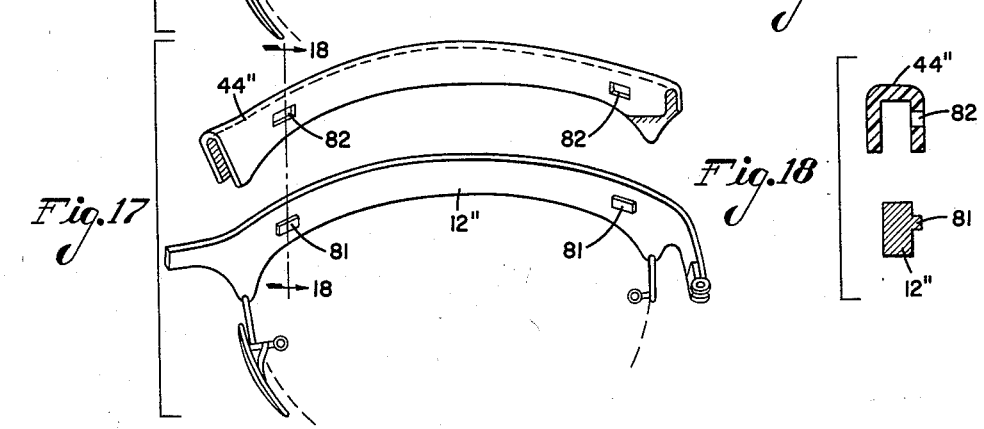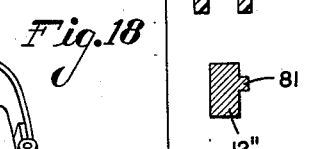

2,922,238

SPECTACLE FRAME

Francis B. Neary, Rochester, N.Y., assignor, by mesne assignments, to Textron Inc., Providence, R.I., a corporation of Rhode Island Application February 26, 1957, Serial No. 642,510

4 Claims. (Cl. 41—10)

The present invention relates to spectacle frames and more particularly to combination metal and plastic spectacle frames.

Spectacle frames are now made in a wide variety of designs and colors. Many persons desire spectacles of different colors and/or designs to harmonize with different dress accessories or different apparel to suit different occasions or purposes. Heretofore, manufacturers of spectacle frames, opticians, and optometrists have had to maintain large inventories of various sizes, colors, designs, and shapes of spectacle frames in order to satisfy the requirements and tastes of the public. Moreover, since conventional spectacle frames are made so that the lenses are permanently fixed therein, any individual spectacle user, who has desired to have spectacle frames of different colors and/or designs, has had to buy the corresponding number of complete spectacles, lenses included. This is expensive because the cost of the lenses constitutes a large part of the cost of any spectacle.

Many suggestions have been made at various times for providing spectacle frames having removable lenses so that lenses could be removed from one frame by the wearer and inserted in another frame. None of these prior proposals has achieved commercial success because few people are sufficiently skilled mechanically to be successful in assembling such delicate mechanisms as ophthalmic mountings. Professional practitioners, such as opticians and optometrists, moreover, do not look with favor on the suggestion that patients be permitted to change lenses from one frame to another. They fear that the patient may upset the fine correction required for satisfactory functioning of a carefully worked-out prescription to meet exact conditions found in refraction of an individual patient's eyes. They fear that the corrective lenses will not function as they are intended to, with consequent discomfort to the patient, or in extreme cases, perhaps actual damage to the patient's vision.

Some proposals have been made which seek to solve the same problem by providing differently colored plastic strips for mounting over a frame. In some cases, the proposed construction has been fragile, the design embodying such small and delicate working parts that the overall construction will not stand up under the comparatively rough handling to which wearers subject it. In many instances, moreover, the parts that must be manipulated have been so small that any one who requires glasses for good vision would have difficulty in securing or interchanging the strips on the frame without wearing the glasses, so that the entire purpose is frustrated or defeated.

One object of the present invention is to provide a spectacle frame construction which will permit an optometrist to carry in inventory a minimum number of frames together with a selection of plastic trim members of different colors and designs that are detachably mountable on the frame, so that a wide selection of styles and colors can nevertheless be provided from a limited inventory.

Another object of the invention is to provide a spectacle frame having a plurality of detachable plastic trim members of different colors that may be mounted selectively on the frame, so that a person can assemble at will a frame of a color and design to harmonize with a particular costume or to suit a particular occasion without the expense of purchasing a variety of frames complete with lenses.

A related object of the invention is to provide a spectacle frame construction of the character described, in which the lenses are mounted in a metallic chassis to which are removably attachable the non-metallic trim members, so that differently colored or differently designed trim members can be secured to the chassis to change at will the appearance of the frame.

Another object of the invention is to provide a spectacle frame construction having a plurality of decorative plastic trim members detachably mountable thereon that can be attached and detached to the frame so simply that a person, who cannot see well without glasses, may make a change of trim members readily, by sense of touch in the dark if necessary.

A further object of the invention is to provide a spectacle frame of the character described, which is itself of an attractive appearance, so that the frame may be used without further decoration, or with selected trim members, as desired.

Still another object of the invention is to provide a spectacle frame construction of the character described that is in every way practical and that can be manufactured economically so as to permit the user of a metal spectacle frame to have available at limited cost, merely by change of ornamental frame trim members, a wide variety of differently colored and/or differently ornamented frames.

A still further object of the invention is to provide a spectacle frame having a plurality of differently colored plastic trim members detachably mountable thereon, which may be permanently mounted thereon if desired, very simply and without change in the construction.

Other objects of the invention, and the manner in which the objects of the invention are achieved, will be apparent hereinafter from the specification, considered together with the drawing, and from the recital of the appended claims.

In the embodiments of the invention illustrated in the drawings, the spectacle mounting includes a metallic chassis comprising a pair of metal lens holders, a bridge rigidly securing the lens holders together, and a pair of temples hinged, respectively, to the respective lens holders. In the embodiments shown the bridge is integral with the lens holders. Resilient, decorative plastic trim members are provided which are adapted to fit over the front or tops of the lens holders. Plastic trim members, matching the plastic trim members of the lens holders, may be provided also for the temples.

Each trim member is grooved longitudinally to receive the associated lens holder or temple.

In one of the illustrated embodiments of the invention, the means for securing the trim members to the associated chassis component comprises a pin that is mounted in a wall of the trim member, and that engages in a recess in the confronting surface of the chassis component. The pin may be snapped into the recess, to fasten the trim member removably to the chassis, or the pin may be pressed permanently into the recess to secure the trim member on the chassis permanently.

In another illustrated embodiment of the invention, arched flat springs are used to secure the trim members to the chassis. These springs are carried by the trim members and engage recesses formed in appropriate locations in the chassis. To secure a trim member on the chassis, or to remove it, the trim member is moved relative to the chassis so that the springs are compressed.

In still another embodiment of the invention, bosses or pins integral with the chassis are disposed to engage in recesses in the opposed surface of the trim members. The resilience of the trim members is relied upon to permit temporary distortion of the trim members as the bosses or pins are moved into and out of engagement in their respective recesses.

In the drawings:

Fig. 1 is a top plan view of a metallic chassis made according to one embodiment of this invention and showing in dotted lines the lenses and their securing means, the temples being omitted;

Fig. 2 is a front elevation thereof;

Fig. 3 is a top plan view of the spectacle frame of Fig. 1 but showing plastic trim members secured over the lens holders according to one embodiment of this invention;

Fig. 4 is a front elevation of the frame of Fig. 3;

Fig. 5 is a side elevation thereof;

Fig. 6 is an exploded view on an enlarged scale from the rear, showing the right trim member separated from the metallic chassis;

Fig. 7 is a section on a more enlarged scale, taken on the line 7—7 of Fig. 6 looking in the direction of the arrows, and showing the holding pin separated from the trim member;

Fig. 8 is a top plan view of the right temple of the frame;

Fig. 9 is a side elevation thereof looking at the outside of the temple;

Fig. 10 is a top plan view of the right temple with a trim member mounted thereon according to one embodiment of this invention;

Fig. 11 is a front elevation thereof;

Fig. 12 is a side elevation thereof, looking at the inside of the temple;

Fig. 13 is a section, on an enlarged scale, taken on the line 13—13 of Fig. 11, looking in the direction of the arrows;

Fig. 14 is an exploded view on an enlarged scale of another embodiment of the invention showing the right trim member separated from the lens holder with which it is associated;

Fig. 15 is a section, on a more enlarged scale, taken on the line 15—15 of Fig. 14 looking in the direction of the arrows;

Fig. 16 is a perspective view of the arched flat metal spring employed in this embodiment of this invention;

Fig. 17 is an exploded view on the same scale as Fig. 14 of still another embodiment of the invention showing the right trim member separated from the lens holder; and Fig. 18 is a section, on a more enlarged scale, taken on the line 18—18 of Fig. 17 looking in the direction of the arrows.

Referring now to the drawings by numerals of reference, the spectacle mounting 10, shown in Figs. 1 and 2, includes a pair of lens holders 12 and 14 respectively, that are interconnected by an integral bridge 16. The lens holders have curved temporal end portions 18 and 20 respectively to which temples may be hingedly secured. The lenses 22 and 24 respectively are adapted to be held in the respective lens holders.

A pair of downwardly depending arms 25 and 34 are formed integral with each lens holder. Their arms extend along the nasal and temporal sides, respectively, of each lens holder and are contoured in conventional manner to follow generally the curvature of the adjacent edges of the lens. The lenses 22 and 24 are secured to the arms 25 and 34 in conventional manner by screws 28. Arms 27, which extend from the arms 25, carry the conventional nasal pads 30, 32.

The front faces of the lens holders and bridge may be plain or may be decorated with patterns generally indicated by the numeral 42 (Fig. 2), which may be engraved, cast, or embossed, or otherwise placed thereon.

According to this invention, colored, decorative, resilient plastic trim members 44 and 46 may be secured over the tops or fronts of the lens holders 12, and 14. The trim members are preferably made alike except that one is a right-hand and the other a left-hand member.

As best shown in Fig. 6, the trim member 44 has a longitudinal groove 48 that is sufficiently deep to receive the lens holder 12, so that the front and rear faces thereof are completely covered by the front and rear walls 50 and 52 respectively of the trim member.

Each of the trim members 44, 46 is secured at each end thereof to its respective lens holder. As best shown in Figs. 6 and 7, the securing means may comprise a pair of pins 58, one adjacent each end of the trim member, that are secured fixedly in holes 60 in the rear wall 52 of trim member, and that are adapted to engage in corresponding milled recesses 62 in the rear face of the lens holder. To assemble the trim member on the lens holder, the trim member is pressed firmly down on the lens holder, and when the pins 58 register with their respective recesses 62, they snap into the recesses, resiliently holding the trim members on the chassis. The plastic trim members are resilient enough to yield sufficiently for the pins 58 to slide over the back face of the lens holders until the pins snap into locking engagement with the recesses 62.

The temples of the frame, see right-hand temple 64, for instance, may bear decorative patterns generally indicated by the numeral 66 similar to the decorations 42 of the lens holders and bridge. They may also, however, at will be covered by colored, resilient plastic trim members 68, similar to trim members 44 and 46. Each of these trim members 68 is grooved as denoted at 74, and each is detachably secured to its temple by a pair of pins 70 (Figs. 12 and 13). Similar to pins 58, the pins 70 are fixedly secured in holes 72 in the inside walls of the trim members. Each pin is adapted to engage in a milled recess 75 on the inside face of the temple to secure the trim member on the temple.

To detach a trim member from the frame, a slight lateral movement of the trim member on its associated chassis component is all that is required. Since the recesses in the chassis are milled, their depth decreases toward their ends, and a lateral movement of the trim member will ease the pins out of engagement in the recesses.

Since the temporal end portion of each trim member is curved to correspond to the curvature of the temporal end portion of its associated lens holder, undesired lateral movement of the trim member on the lens holder in use is prevented.

The trim members may be provided in different colors, and can even be provided with decorations, such as rhinestones, if desired.

Because of its decorative appearance, the frame described may be used as is, without trim members, but when it is desired to have a particular color of frame, or a particular decorative feature, then suitable trim members will be secured to the frame over its decorations. The plastic trim members afford wide latitude for variation in decoration, style, and/or configuration. In this way, an optometrist or a user of glasses may change the appearance of the glasses at will. The different appearance characteristics which may be achieved are limited only by the number of differently colored, contoured, and styled trim members which are available.

Because it is not usually desirable to have the wearer repeatedly assembling and disassembling trim members on an ophthalmic mounting because repeated handling may disturb the delicate adjustment of the lenses, the trim members are usually permanently fixed to the spectacle chassis. Despite this, however, the invention provides a real advantage to the professional practitioner, such as an optician or an optometrist, because it enables him to reduce his inventory materially. This, of course, also means an ultimate, substantial saving to the customer. The optician or optometrist can carry a few frames, and a vastly greater number of sets of inexpensive trim members; and when a customer comes in who wants a particular color or style of frame, the practitioner can select a suitable size and shape of frame and suitable trim, and in a few seconds provide the customer with the color and style of frame he or she wants.

To secure a trim member on its associated chassis component permanently, it is merely necessary to secure the pins 58, 70 permanently in place on the chasis. For this purpose, the pins may be pressed in place, as though they were rivets. In the embodiment of the invention shown in Figs. 14 through 16, a trim member 44' is shown which has in its rear wall 52' adjacent each end slots 78 formed. An arched flat metal spring 79 is pressed in each slot, as best shown in Fig. 15, and is resiliently retained therein. Recesses 80 are milled in the rear surface of the lens holder 12. Each arched flat spring 79 is mounted to project into a recess 80. To secure the trim member on the lens holder, the trim member is merely pressed down over the lens holder. When the springs 79 and the recesses 80 register, the springs expand and engage in the recesses, to secure the trim member on the lens holder. To remove the trim member from the lens holder, or other frame component, the trim member may be forced to slide slightly laterally along the frame component, so that the spring engages against and is compressed gradually by the sloped end of the milled recess, and is disengaged from its recess.

Still another embodiment of the invention is illustrated in Figs. 17 and 18. The lens holder 12" has a raised boss 81 on its inner or rear face, adjacent each end thereof, that may be integral with or struck from, or otherwise rigidly connected with the lens holder. The trim member 44" has slots 82 that correspond in position to the bosses 80. To secure the trim member on the lens holder, the trim member is distorted to force it over the lens holder and the projecting bosses 80, and when the bosses 80 register with the slots 82, they snap into the slots 82. To remove the trim member, it needs only to be distorted sufficiently for the bosses 80 to be disengaged from the slots.

The embodiments of the invention shown in Figs. 14 to 18 are particularly designed to permit interchange of various forms of trim by the wearer of the glasses. From the preceding description, it will be seen that any user of these spectacles can readily change a decorated spectacle frame made wholly of metal to a combined plastic and metal frame with plastic trim of any desired color, style and shape, and can just as readily change a set of trim members from one spectacle frame to another.

Thus, with the present invention, a lady can change the color of her spectacles to suit the color of her dress by simply replacing one set of trim members with another set. For evening wear, the lady can use a more elaborate set of trim members than for work day use. In this way, a single pair of spectacles can be employed for every occasion simply by attaching to the frame the appropriate trim members.

A primary advantage of the construction is that a person need have no special mechanical skill in order to fasten a set of trim members on a chassis. Moreover, the securing means are simple and do not require close inspection, and hence can be operated by a person who is not wearing glasses. The fastening of trim members on a chassis can be accomplished solely by the sense of touch, as can the removal or exchange of trim members.

It will be understood that the fastening means described above for securing trim members to lens holders is equally applicable for fastening trim members on temples.

While the invention has been described, then, in connection with several embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A spectacle mounting comprising a metallic chassis including a pair of metallic lens holders for holding the lenses of a spectacle, and a bridge rigidly secured to said lens holders at the nasal sides thereof, a pair of resilient, decorative, non-metallic semi-rim members, each rim member being grooved longitudinally to receive part of the associated lens holder and to overlie the front and rear faces of said associated lens holder, and means for detachably securing each rim member to the lens holder with which it is associated, said securing means comprising two pairs of parts spaced from one another longitudinally of the lens holder, one part of each pair being disposed on one of said faces of said lens holder and the two cooperating parts of the two pairs being disposed on the confronting face of the groove in said rim member, each pair of parts being spaced from the ends of the lens holder and comprising a member projecting from one of the confronting faces and a longitudinal groove in the other confronting face in which said projecting member engages said longitudinal groove having a concave bottom and decreasing in depth from its center to its ends.

2. A spectacle mounting comprising a metallic chassis including a pair of metallic lens holders for holding the lenses, and a bridge rigidly secured to said lens holders at the nasal sides thereof, said lens holders each having a rearwardly-curved temporal end portion, a pair of resilient, plastic decorative semi-rim members, each of which is curved rearwardly at its temporal end corresponding to the rearward curvature of the temporal end portion of one of said lens holders, each rim member being grooved longitudinally to receive part of the associated lens holder, including the temporal end portion thereof, and to overlie the front and rear faces of the associated lens holder, and means for detachably securing each rim member at spaced points to the lens holder with which it is associated, said securing means being disposed on one of said faces of the lens holder and on a confronting face of the groove in the rim member and comprising a pair of members projecting from one of the confronting faces and a pair of longitudinal grooves in the other confronting surface in which the projecting members engage, said longitudinal grooves each having a concave bottom surface and decreasing in depth from the center to the respective ends, the curved temporal end portion of said lens holder being adapted to limit lateral movement of each rim member on its associated lens holder.

3. A spectacle mounting comprising a metallic chassis including a pair of metallic lens holders for holding the lenses of a spectacle, and a bridge rigidly secured to said lens holders at the nasal sides thereof, a pair of resilient, decorative, plastic semi-rim members, each rim member being grooved longitudinally to receive part of a lens holder and to overlie the front and rear faces of the associated lens holder, and means for detachably securing each rim member to the lens holder with which it is associated, said securing means comprising associated parts on one wall of the groove in said semi-rim and on the confronting face of said lens holder, respectively, and comprising a flat spring arched outwardly from one surface and spring-pressed constantly to project into said groove, and a longitudinal groove in the associated confronting face in which the projecting portion of said spring engages, said longitudinal groove having a concave bottom surface and decreasing in depth from its center to its respective ends.

4. A spectacle mounting comprising a metallic chassis including a pair of metallic lens holders for holding the lens of a spectacle, and a bridge rigidly secured to said lens holders at the nasal sides thereof, a pair of resilient, decorative, plastic semi-rim members, each rim member being grooved longitudinally to receive part of a lens holder and to overlie the front and rear faces of the associated lens holder, and means for detachably securing each rim member to a lens holder with which it is associated, said securing means comprising a pin secured in the rim member and projecting into its groove, and a longitudinal groove in the rear face of the associated lens holder, said groove having a concave bottom surface and decreasing in depth from its center to its respective ends, in which said pin engages.

References Cited in the file of this patent

UNITED STATES PATENTS

| | | |
|---|---|---|
| 2,703,036 | Splaine | Mar. 1, 1955 |
| 2,748,654 | Rohrback et al. | June 5, 1956 |
| 2,781,693 | Brumby | Feb. 19, 1957 |

FOREIGN PATENTS

| | | |
|---|---|---|
| 273,731 | Switzerland | May 16, 1951 |